(12) United States Patent
Son et al.

(10) Patent No.: US 8,340,848 B2
(45) Date of Patent: Dec. 25, 2012

(54) METHOD AND SYSTEM FOR SENSORLESS CONTROL OF AN ELECTRIC MOTOR

(75) Inventors: Yo Chan Son, Torrance, CA (US); Nitinkumar R. Patel, Cypress, CA (US); Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1277 days.

(21) Appl. No.: 11/947,501

(22) Filed: Nov. 29, 2007

(65) Prior Publication Data

US 2009/0140676 A1 Jun. 4, 2009

(51) Int. Cl.
*B60L 9/00* (2006.01)
(52) U.S. Cl. ........... 701/22; 318/400.04; 318/400.34; 318/727; 318/807; 318/802
(58) Field of Classification Search ............. 701/22; 318/802, 400.34, 400.04, 727, 807, 561
See application file for complete search history.

(56) References Cited

U.S. PATENT DOCUMENTS

| | | | |
|---|---|---|---|
| 5,444,351 A * | 8/1995 | Yamamura et al. ........... 318/811 |
| 5,703,449 A | 12/1997 | Nagate et al. |
| 5,744,921 A | 4/1998 | Makaran |
| 6,788,490 B2 * | 9/2004 | Schillaci et al. ........... 360/78.04 |
| 6,894,454 B2 | 5/2005 | Patel et al. |
| 7,211,984 B2 | 5/2007 | Patel et al. |
| 7,274,161 B2 | 9/2007 | Mori et al. |
| 7,288,911 B2 | 10/2007 | MacKay |
| 7,414,425 B2 | 8/2008 | O'Gorman et al. |
| 7,557,530 B2 | 7/2009 | Tesch et al. |
| 7,652,441 B2 | 1/2010 | Ying Yin Ho |
| 2003/0218444 A1 * | 11/2003 | Marcinkiewicz et al. ..... 318/727 |
| 2005/0179264 A1 * | 8/2005 | Ganev ............. 290/40 C |
| 2006/0097688 A1 * | 5/2006 | Patel et al. ................. 318/778 |
| 2006/0119312 A1 * | 6/2006 | Okamura et al. ............. 318/807 |
| 2007/0069677 A1 | 3/2007 | MacKay |
| 2007/0145939 A1 * | 6/2007 | Tajima et al. ................. 318/802 |
| 2007/0164694 A1 * | 7/2007 | Boscolo Berto ............. 318/254 |
| 2008/0018274 A1 | 1/2008 | Mori et al. |
| 2009/0140676 A1 * | 6/2009 | Son et al. ................. 318/400.04 |
| 2009/0184678 A1 | 7/2009 | Son et al. |
| 2010/0064706 A1 | 3/2010 | Hattori et al. |

FOREIGN PATENT DOCUMENTS

CN 1976213 A 12/2010

OTHER PUBLICATIONS

Office Action dated Oct. 25, 2010, issued in U.S. Appl. No. 12/017,817.

(Continued)

*Primary Examiner* — Redhwan K Mawari
(74) *Attorney, Agent, or Firm* — Ingrassia Fisher & Lorenz, P.C.

(57) ABSTRACT

Methods and systems for controlling an electric motor are provided. A signal comprising at least first and second cycles is provided to the electric motor. A first flux value for the electric motor associated with the first cycle of the signal is calculated. A second flux value for the electric motor associated with the second cycle of the signal is calculated based on the first flux value.

13 Claims, 9 Drawing Sheets

OTHER PUBLICATIONS

Son, Y., et al. "Sensorless Operation of Permanent Magnet Motor Using Direct Voltage Sensing Circuit," Record of the Industry Applications Conference, 2002, pp. 1674-1678, vol. 3.

Son, Y.C. et al., "Method and System for Initiating Operation of an Electric Motor," U.S. Appl. No. 12/606,839, filed Oct. 27, 2009.

Pan, H., et al. "Improving the start and restart behavior through state recognition of AC drives," IEEE Proceeding of the Power Conversion Conference, Aug. 3-6, 1997, pp. 589-594, vol. 2.

Taniguchi, S., et al. "Starting Procedure of Rotational Sensorless PMSM in the Rotating Condition," IEEE Transactions on Industry Applications, Jan.-Feb. 2009, pp. 194-202, vol. 45, No. 1.

Office Action dated Nov. 17, 2010, issued in Chinese Patent Application No. 200910002790.6.

USPTO, U.S. Office Action mailed Apr. 6, 2012 for U.S. Appl. No. 12/606,839.

Notice of Allowance, dated Jul. 16, 2012, issued in U.S. Appl. No. 12/606,839.

\* cited by examiner

METHOD AND SYSTEM FOR SENSORLESS CONTROL OF AN ELECTRIC MOTOR

TECHNICAL FIELD

The present invention generally relates to the control of electric motors. More specifically, the present invention relates to a method and system for sensorless control of an electric motor, such as one in used in a drive system of an automobile.

BACKGROUND OF THE INVENTION

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another actuator, to drive the wheels.

Traditional motor control systems normally include a feedback device or position sensor, such as a resolver or encoder, to provide speed and position information about the motor. Feedback devices and associated interface circuits increase the costs of a motor control system, and these costs may become prohibitive in high volume applications such as the production of automobiles. Additionally, a position sensor and its associated wiring harness increase the complexity and assembly time of an electric drive system in a vehicle.

Electric vehicles powered by fuel cells, batteries and hybrid systems that include electric motors are becoming more common in the automotive market. As production volumes for electric vehicles increase, the cost of feedback devices and associated interface circuits will become significant. Automakers are therefore always striving to cut costs and reduce the number of parts for a vehicle. The removal of a feedback device for an electric motor control system will lead to significant cost reductions for an electric vehicle.

Hybrid electric and electric vehicles today utilize numerous electric motor control technologies such as the vector control of electric motors. A vector motor control scheme is a computationally intensive motor control scheme that maps the phase voltages/currents of a three-phase motor into a two axis coordinate system. The structure used to excite an electric motor using a vector control scheme is a typical three-phase power source inverter including six power transistors that shape the output voltage to an electric motor. Vector control requires rotor position information, which is normally obtained via a feedback device or position sensor. The objective of the position sensorless control is to obtain the rotor position information utilizing electromagnetic characteristics of an AC machine, eliminating the position sensor and its associated interface circuits.

Accordingly, it is desirable to provide an improved method and system for sensorless control of an electric motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method for controlling an electric motor is provided. A signal including at least first and second cycles is provided to the electric motor. A first flux value for the electric motor associated with the first cycle of the signal is calculated. A second flux value for the electric motor associated with the second cycle of the signal is calculated based on the first flux value.

A method for controlling an automotive electric motor having a winding is provided. A signal including first and second cycles is provided to the electric motor. A winding flux error is determined based on a measured winding flux and an estimated winding flux. A first flux value of the electric motor is calculated based on the winding flux error. The first flux value includes flux linkage, a back electromotive force (BEMF) generated by the motor, or a combination of the flux linkage and the BEMF.

An automotive drive system is provided. The automotive drive system includes an electric motor, a direct current (DC) power supply coupled to the electric motor, a power inverter coupled to the electric motor and the DC power supply to receive DC power from the DC power supply and provide alternating current (AC) power to the electric motor, and a processor in operable communication with the electric motor, the DC power supply, and the power inverter. The processor is configured to provide a signal including at least first and second cycles to the electric motor, calculate a first flux value for the electric motor associated with the first cycle of the signal, and calculate a second flux value for the electric motor associated with the second cycle of the signal based on the first flux value.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-15 are merely illustrative and may not be drawn to scale.

FIG. 1 to FIG. 15 illustrate a method and system for controlling an electric motor. The system includes a digitally controlled flux observer that is implemented in a discrete time domain. More particularly, the flux observer utilizes the signal (e.g., a pulse width modulation signal) which is used to drive the electric motor to time the updates made to flux and back electromotive force (BEMF) measurements.

For example, in one embodiment, a signal including at least first and second cycles is provided to the electric motor. A first flux value for the electric motor and associated with the first cycle of the signal is calculated. A second flux value for the electric motor and associated with the second cycle is calculated based on (or derived from) the first flux value. The process is then repeated. The first and second flux values may be, for example, estimated flux linkages, estimated BEMF strengths, estimated flux increments, estimated BEMF increments, or any combination thereof.

The current flowing through the electric motor may also be measured during the second cycle, and the second flux value may also be based on the measured current. The signal may also include a third cycle that occurs before the first and second cycles, during which a current flowing through the electric motor may be measured. The second flux value may also be based on the current measured during the third cycle.

In another embodiment, a winding flux error is determined based on a measured winding flux and an estimated winding flux. A flux value (e.g., flux linkage and/or BEMF) of the electric motor is calculated based on the winding flux error.

Figure 1:
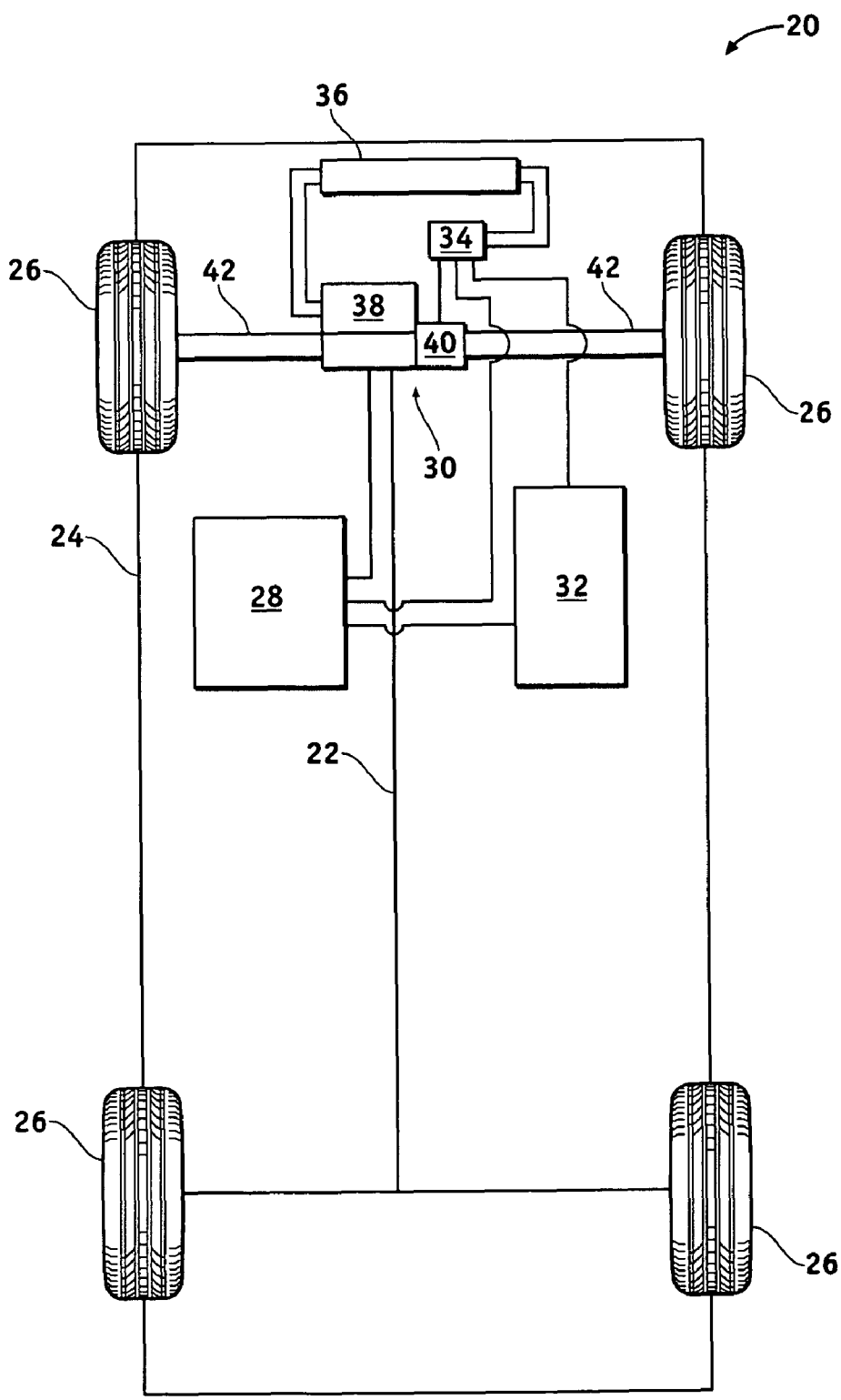
FIG. 1 is a schematic view of an exemplary automobile according to one embodiment of the present invention.

FIG. 1 illustrates a vehicle 20, or "automobile," according to one embodiment of the present invention. The automobile 20 includes a chassis 22, a body 24, four wheels 26, and an electronic control system (or electronic control unit (ECU)) 28. The body 24 is arranged on the chassis 22 and substantially encloses the other components of the automobile 20. The body 24 and the chassis 22 may jointly form a frame. The wheels 26 are each rotationally coupled to the chassis 22 near a respective corner of the body 24.

The automobile 20 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The automobile 20 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 1, the automobile 20 is a hybrid vehicle, and further includes an actuator assembly (or powertrain) 30, a battery 32, a power inverter (or inverter) 34, and a radiator 36. The actuator assembly 30 includes an internal combustion engine 38 and an electric motor/generator (or motor) system (or assembly) 40. The electric motor system 40, in one embodiment, includes one or more sinusoidally-wound, three-phase alternating current (AC) motor/generators (or motors) (e.g., permanent magnet) such as commonly used in automotive vehicles (e.g., traction drive control systems, and the like). As will be appreciated by one skilled in the art, each of the electric motors includes a stator assembly (including conductive coils), a rotor assembly (including a ferromagnetic core), and a cooling fluid (i.e., coolant). The stator assembly and/or the rotor assembly within the electric motors may include multiple (e.g., sixteen) electromagnetic poles, as is commonly understood.

Still referring to FIG. 1, and as described in greater detail below, the combustion engine 38 and the electric motor system 40 are integrated such that both are mechanically coupled to at least some of the wheels 26 through one or more drive shafts 42. The radiator 36 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the engine 38 and the inverter 34. Referring again to FIG. 1, in the depicted embodiment, the inverter 34 receives and shares coolant with the electric motor 40. The radiator 36 may be similarly connected to the inverter 34 and/or the electric motor 40.

The electronic control system 28 is in operable communication with the actuator assembly 30, the battery 32, and the inverter 34. Although not shown in detail, the electronic control system 28 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Figure 2:
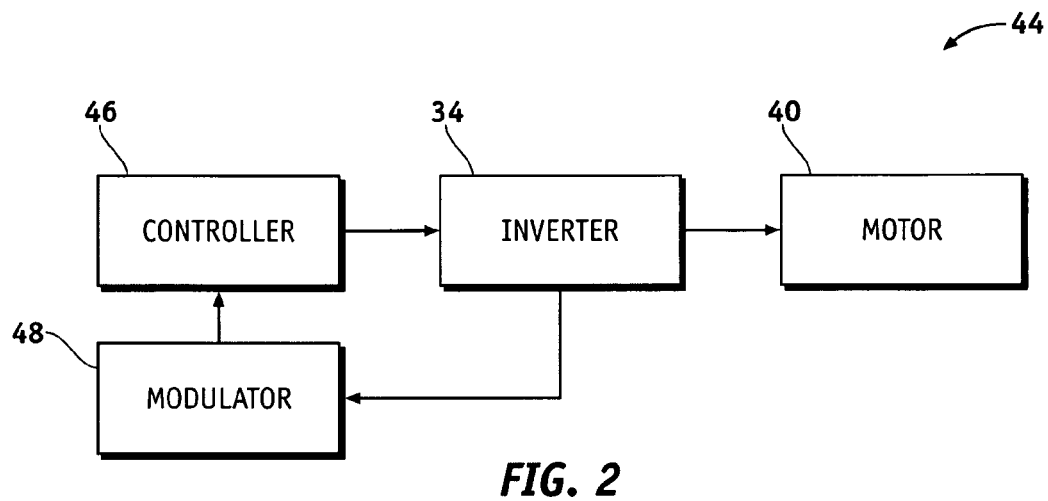
FIG. 2 is a block diagram of an inverter system within the automobile of FIG. 1.

Referring to FIG. 2, a voltage source inverter system (or electric drive system) 44 is shown in accordance with an exemplary embodiment of the present invention. The voltage source inverter system 44 includes a digital controller 46, the inverter 34 coupled to an output of the controller 46, the motor 40 coupled to a first output of the inverter 34, and a modulator 48 having an input coupled to a second output of the inverter 34 and having an output coupled to an input of the controller 46. The controller 46 and the modulator 48 may be integral with the electronic control system 28 shown in FIG. 1.

Figure 3:
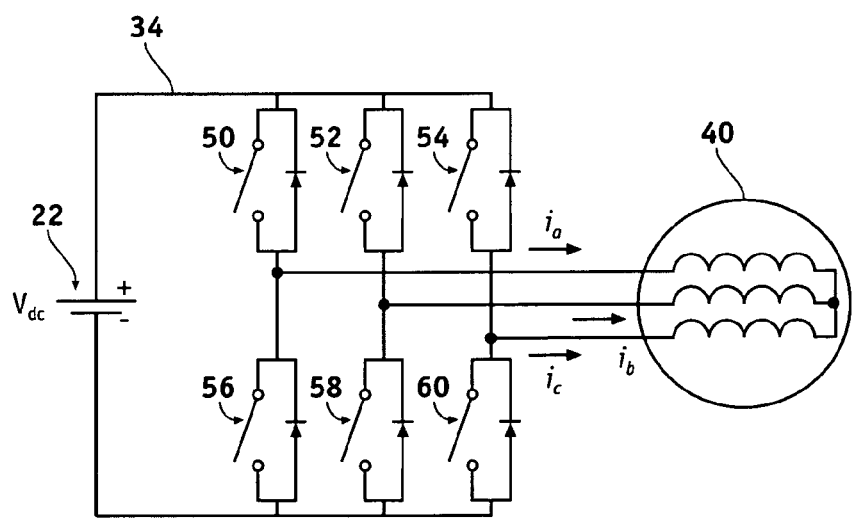
FIG. 3 is a schematic view of a power inverter within the automobile of FIG. 1.

FIG. 3 illustrates the inverter 34 of FIGS. 1 and 2 in greater detail. The inverter 34 includes a three-phase circuit coupled to the motor 40. More specifically, the inverter 34 includes a switch network having a first input coupled to a voltage source $V_{dc}$ (e.g., the battery 32) and an output coupled to the motor 40. Although a single voltage source is shown, a distributed direct current (DC) link with two series sources may be used.

The switch network comprises three pairs (a, b, and c) of series switches with antiparallel diodes (i.e., antiparallel to each switch) corresponding to each of the phases. Each of the pairs of series switches comprises a first switch, or transistor, (i.e., a "high" switch) 50, 52, and 54 having a first terminal coupled to a positive electrode of the voltage source 32 and a second switch (i.e., a "low" switch) 56, 58, and 60 having a second terminal coupled to a negative electrode of the voltage source 32 and having a first terminal coupled to a second terminal of the respective first switch 50, 52, and 54.

Still referring to FIG. 1, the automobile 20 is operated by providing power to the wheels 26 with the combustion engine 38 and the electric motor 40 in an alternating manner and/or with the combustion engine 38 and the electric motor 40 simultaneously. In order to power the electric motor 40, DC power is provided from the battery 32 to the inverter 34, which converts the DC power into AC power, before the power is sent to the electric motor 40. As will be appreciated by one skilled in the art, the conversion of DC power to AC power is substantially performed by operating (i.e., repeatedly switching) the switches 50-60 within the inverter 34 at a "switching frequency," such as, for example, 12 kilohertz (kHz).

Referring again to FIG. 2, generally, the controller 46 produces Pulse Width Modulation (PWM) signals, including multiple cycles, for controlling the switching action of the inverter 34, and thus the motor 40. In a preferred embodiment, the controller 46 preferably produces continuous PWM (CPWM) signals where each upper and lower switch conducts for a portion of each switching cycle of the inverter 34. The inverter 34 then converts the PWM signals to a modulated voltage waveform for operating the motor 40.

In accordance with one aspect of the present invention, a method (or algorithm) and system for estimating rotor position of a permanent magnet AC machine (e.g., the motor 40) are provided. This algorithm may be used during high speed motor operation. The motor flux (or flux linkage) and BEMF increment are calculated or estimated based on currents and voltages (i.e., commanded or measured) within the motor. The estimated flux is compared with a measured flux. The flux and BEMF estimation is updated based on the flux and BEMF increment from the motor model and the flux error.

Figure 4:
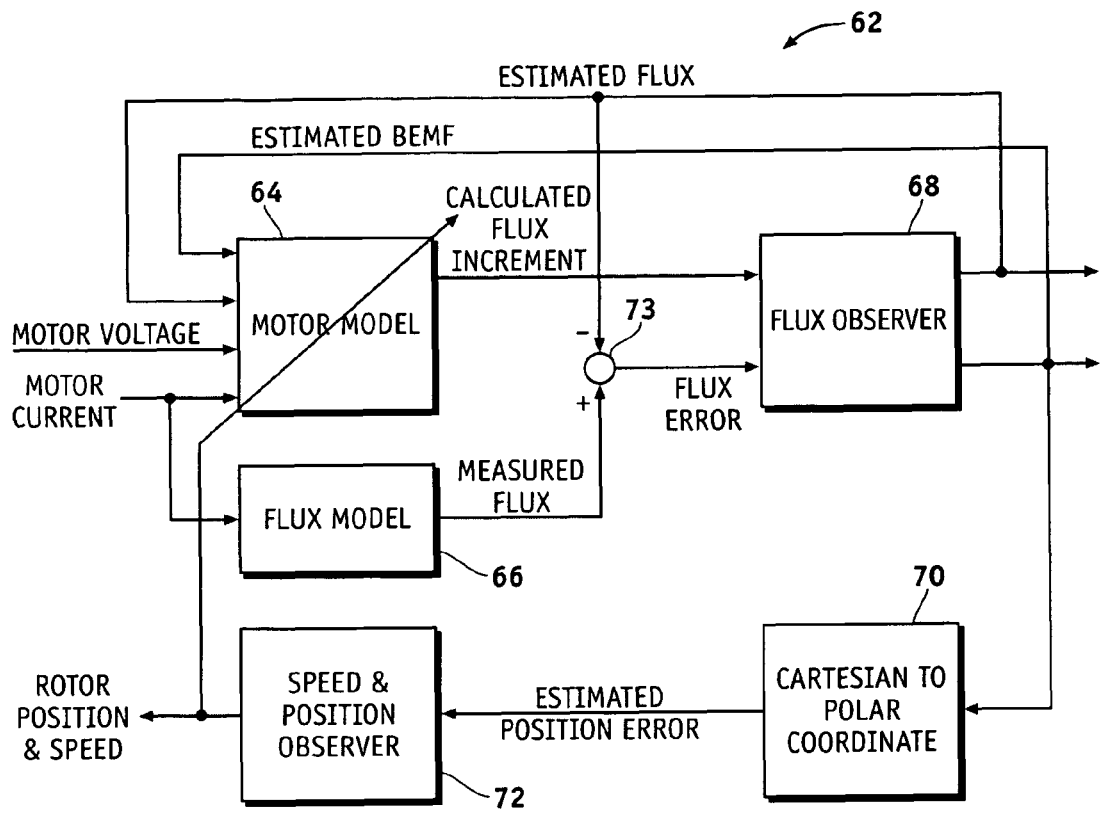
FIG. 4 is a block diagram of a method and/or system for estimating the rotor position and speed of a motor according to one embodiment of the present invention.

FIG. 4 is a block diagram illustrating a method and/or system 62 for estimating the rotor position and speed of a motor according to one embodiment of the present invention. The method and/or system 62 includes a motor model block 64, a flux model block 66, a flux observer block 68, a coordinate conversion block 70, and a speed and position observer block 72. In one embodiment, the system 62 utilizes the calculations of flux and back electromotive force (BEMF) implemented at the synchronously rotating reference frame (or synchronous frame) made by the flux observer block (or flux observer) 68.

The motor model block (or motor model) 64 receives a motor voltage and a motor current as input, along with an estimated flux and BEMF from the flux observer block 68. The motor model block 64 generates increments of the flux and the BEMF for each sampling time (or each cycle of the PWM signal) which are sent to the flux observer block 68. The flux model block (or flux model) 66 receives the motor current as an input and generates a measure of the motor flux from, for example, a flux table. A flux error is calculated from the difference of the estimated flux from the flux observer block 68 and the measured flux from the flux model block 66 at summation circuit (or summer) 73. The measured flux, or flux quantity, is also used as a feedforward control (or decoupling current) of the current control for the motor. The flux error and the increments from the motor model block 64 are received as input by the flux observer block 68, which estimates the motor flux and BEMF.

In one embodiment, the estimated flux accounts for the flux generated by the windings in the stator of the motor 40, while the flux generated by the permanent magnets in the motor 40 is excluded. One advantage of this method is that the estimated flux is not dependent on the temperature of the motor magnets, as it is determined by the geometry of the motor and the material properties of the stator and rotor core. The estimated BEMF corresponds to the voltage induced by the permanent magnet flux, and its angle contains the position estimation error.

The estimated position error is then sent to the speed and position observer block 72 to estimate the rotor position and speed. Because the magnitude of the estimated BEMF is not used in the position and speed estimation, the temperature variation of the rotor, especially the permanent magnet, does not affect the estimation of the rotor position and speed.

Figure 5:
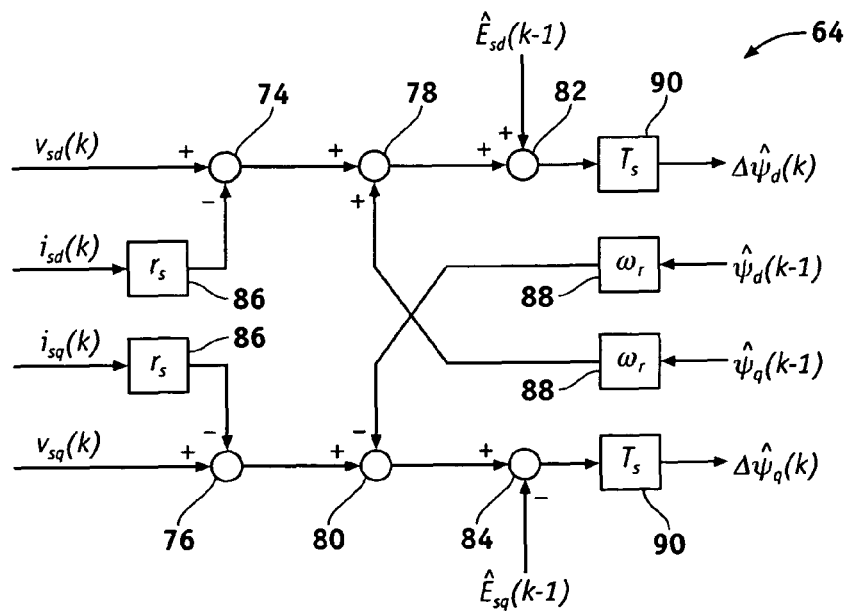
FIG. 5 is a schematic block diagram of a motor model block within the system of FIG. 4.

FIG. 5 illustrates the motor model block 64 in greater detail. The motor model block 64 includes summers 74-84, resistor value blocks 86, operating frequency value blocks 88, and sampling time value blocks 90. As shown, synchronous reference frame voltages, $v_{sd}(k)$ and $v_{sq}(k)$, are subtracted by the voltage drops at the stator resistor at summers 74 and 76, respectively. The voltage drops are determined by multiplying measured synchronous frame currents, $i_{sd}(k)$ and $i_{sq}(k)$, by the resistance value of the stator resistor ($r_s$). As will be described in greater detail below, the value k corresponds to a particular cycle in the PWM signal.

The resulting net voltages contribute to the stator fluxes. At summers 78 and 80, respectively, voltages induced by estimated winding fluxes, $\hat{\Psi}_d(k-1)$ and $\hat{\Psi}_q(k-1)$, are subtracted after being multiplied by the operating frequency ($\hat{\omega}_r$). While at summers 82 and 84, estimated BEMF values, $\hat{E}_{sd}(k-1)$ and $\hat{E}_{sq}(k-1)$, are subtracted. The remaining voltage values are multiplied by the sampling periods of calculation, $T_s$, and result in the expected flux increment of the winding fluxes at the k-th sampling period, $\Delta\hat{\Psi}_d(k)$ and $\Delta\hat{\Psi}_q(k)$.

Figure 6:
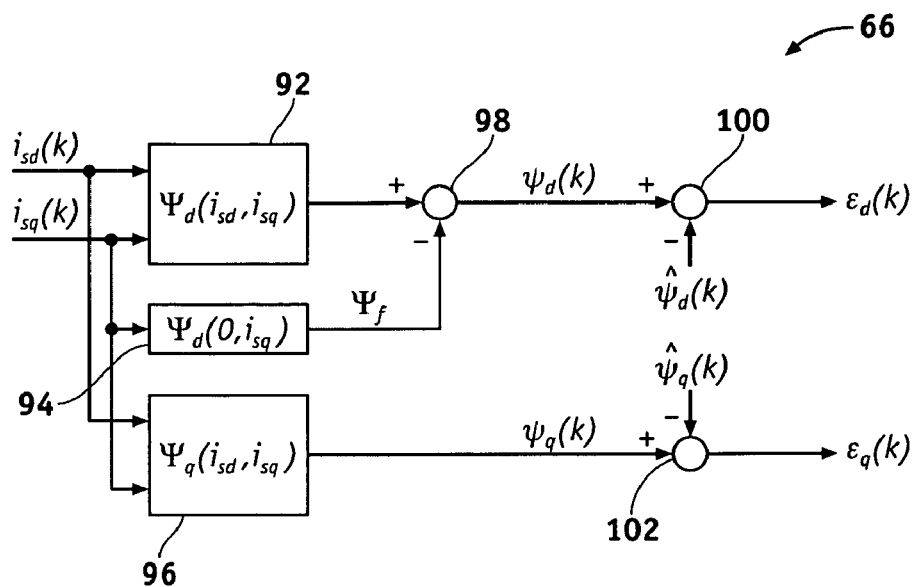
FIG. 6 is a schematic block diagram of a flux model within the system of FIG. 4.

FIG. 6 illustrates the flux model block 66 in greater detail. The flux model block 66 includes flux table blocks 92, 94, and 96 and summers 98, 100, and 102. In one embodiment, the flux tables 92, 94, and 96 are two-dimensional flux tables, similar to those used for decoupling in a saturated motor. It is assumed that the permanent-magnet flux ($\Psi_f$) is separable from the d-axis flux table $\Psi_d$, and it is also assumed that q-axis flux is independent of the permanent magnet flux. Flux table blocks 92 and 94 are from the same d-axis table, and the d-axis flux is assumed to be the permanent magnet flux when there is no d-axis current, as is determined by flux table block 94. As indicated in FIG. 6, the synchronous frame currents, $i_{sd}(k)$ and $i_{sq}(k)$, are received by the flux table blocks 92, 94, and 96 to generate the flux in the d-axis and the q-axis. The d-axis flux is generated by flux table block 92, from which the permanent magnet flux is subtracted at summer 98, resulting in the d-axis winding flux $\Psi_d(k)$. The q-axis winding flux $\Psi_q(k)$ is directly obtained from flux table block 96. In one embodiment, the winding fluxes $\Psi_d(k)$ and $\Psi_q(k)$ determined by the flux table blocks 92, 94, and 96 are assumed to be measured fluxes. Estimated fluxes, $\hat{\Psi}_d(k)$ and $\hat{\Psi}_q(k)$, are then subtracted from the measured winding fluxes, $\Psi_d(k)$ and $\Psi_q(k)$, at summers 100 and 102, respectively. The resulting flux errors, $\epsilon_d(k)$ and $\epsilon_q(k)$, are used to drive the flux observer 68 as described below.

Figure 7:
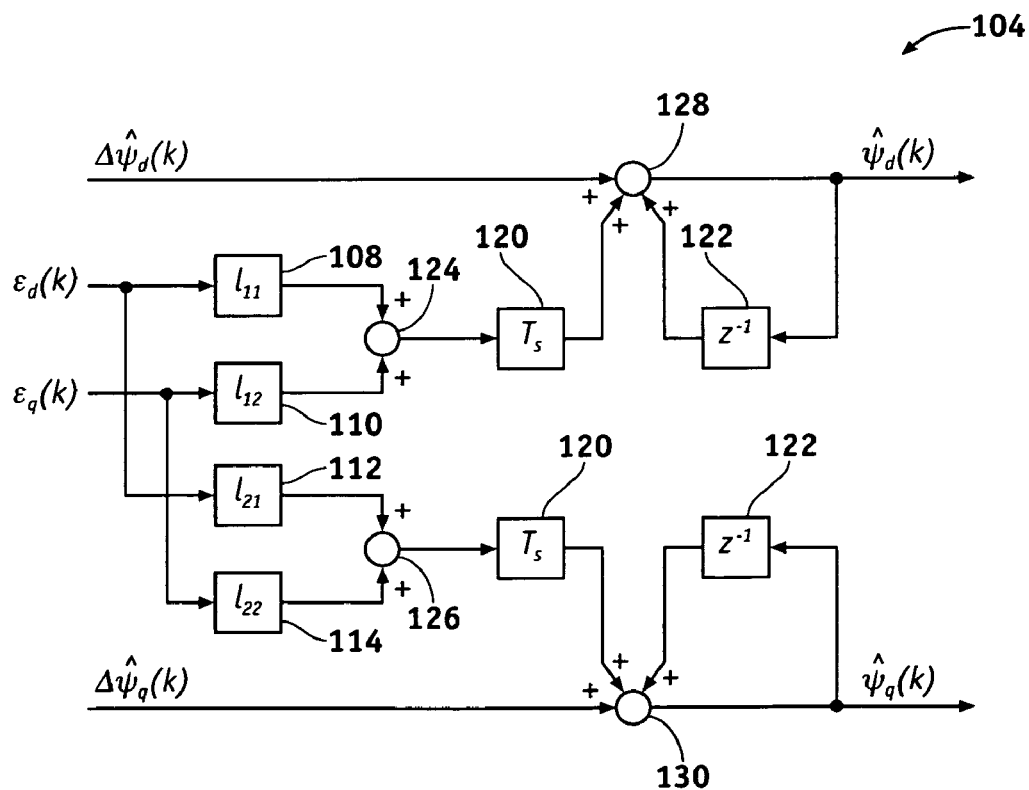
FIGS. 7 and 8 are schematic block diagrams of portions of a flux observer within the system of FIG. 4.
Figure 8:
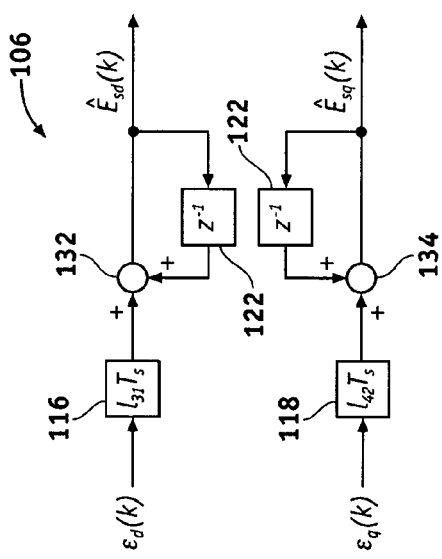

FIGS. 7 and 8 illustrate a flux estimation portion 104 and a BEMF estimation portion 106, respectively, of the flux observer 68. Referring to both FIGS. 7 and 8, the flux estimation portion 104 and the BEMF estimation portion 106 include flux observer gain blocks 108-118, sampling time blocks 120, delay blocks 122, and summers 124-134.

As shown in FIG. 7, the flux estimation portion 104 receives the flux increments, $\Delta\hat{\Psi}_d(k)$ and $\Delta\hat{\Psi}_q(k)$, from the motor model block 64 and the flux errors, $\epsilon_d(k)$ and $\epsilon_q(k)$, from the flux model block 66. The flux errors are multiplied by flux observer gains, $l_{11}$~$l_{22}$, at the flux observer gain blocks 108-114 and added at summers 124 and 126, respectively. The outputs of the summers 124 and 126 are multiplied by the sampling time at sampling time blocks 114 before being sent to summers 128 and 130. The flux increments, $\Delta\hat{\Psi}_d(k)$ and $\Delta\hat{\Psi}_q(k)$, are also received by summers 128 and 130, respectively, to contribute to the correction of the estimated winding fluxes, $\Delta\hat{\Psi}_d(k)$ and $\Delta\hat{\Psi}_q(k)$, which are fed back into the summers 128 and 130 after being delayed one PWM cycle by the delays blocks 122.

As shown in FIG. 8, in one embodiment, the BEMF estimation portion 106 uses only the flux errors, $\epsilon_d(k)$ and $\epsilon_q(k)$, to build up the BEMF estimations, $\hat{E}_{sd}(k)$ and $\hat{E}_{sq}(k)$. The flux errors, $\epsilon_d(k)$ and $\epsilon_q(k)$, are multiplied by flux observer gains, $l_{31}$~$l_{42}$, along with the sampling time, $T_s$, at flux observer gain blocks 116 and 118 before being received by summers 132 and 134, respectively. The BEMF estimations, $\hat{E}_{sd}(k)$ and $\hat{E}_{sq}(k)$, are fed back into the summers 132 and 134 after being delayed one PWM cycle by the delay blocks 122.

Figure 9:
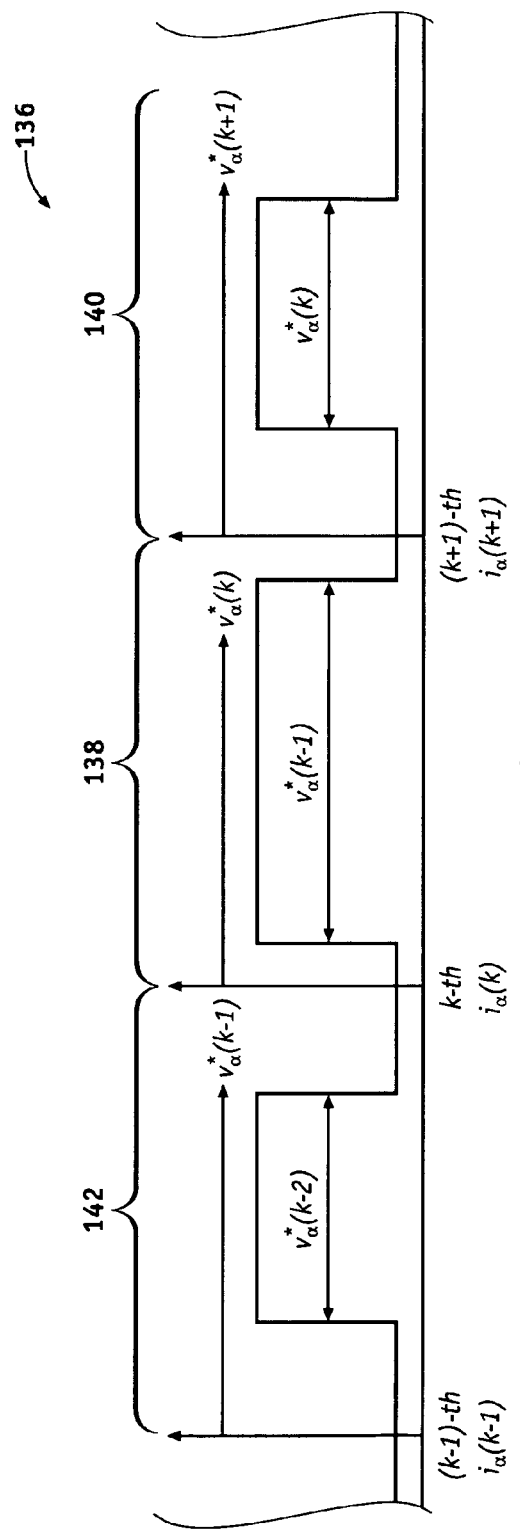
FIG. 9 is a temporal view of a pulse width modulation (PWM) signal utilized by the inverter system of FIG. 2.

FIG. 9 illustrates a portion of a PWM signal 136 generated by the controller 46 and used to control the motor 40, according to one embodiment of the present invention. The portion of the PWM signal 136 includes a first cycle 138, a second cycle 140, and a third cycle 142. Although the cycles in the signal 136 generally follow a sequential order (i.e., k−1, k, k+1, etc.), for illustrative purposes, the third cycle 142 is described as occurring immediately before the first cycle 138, and the first cycle 138 is described as occurring immediately before the second cycle 140.

The digital controller 46 has an inherent one-cycle delay caused by the PWM, which may result in the error of control and estimation. FIG. 9 illustrates an example of the timing of PWM and current sampling used in the motor drive system, according to one embodiment of the present invention. The voltage applied to the motor 40 during the first (or k-th) cycle 138 is calculated during the third (or (k−1)-th) cycle 142. For each cycle, the new voltage is applied at the beginning thereof, and at the same time, the motor current is sampled. For example, at the beginning of the first cycle 138, the motor current may be represented as $i_\alpha(k)$. The voltage applied to build $i_\alpha(k)$ is the voltage (i.e., $v_\alpha^*(k-2)$) applied during the third (or (k−1)-th) cycle 142, which is calculated during the (k−2)-th cycle (not shown).

As such, a two-cycle delay occurs between a commanded voltage and the observance of that commanded voltage by the flux observer 68. Additionally, although every variable besides stationary voltage may be updated as shown in FIG. 9 (i.e., at the beginning of each cycle), the actual average voltage sought by the PWM signal 136 occurs at the mid-point of each cycle (or sampling period). This results in a delay of the voltage angle of the motor 40.

Figure 10:
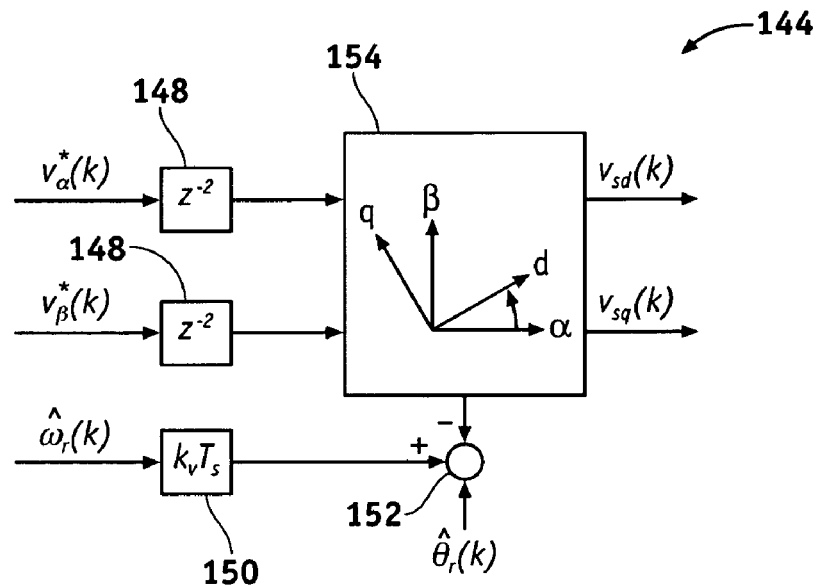
FIGS. 10 and 11 are schematic block diagrams of portions of a coordinate conversion block within the system of FIG. 4.
Figure 11:
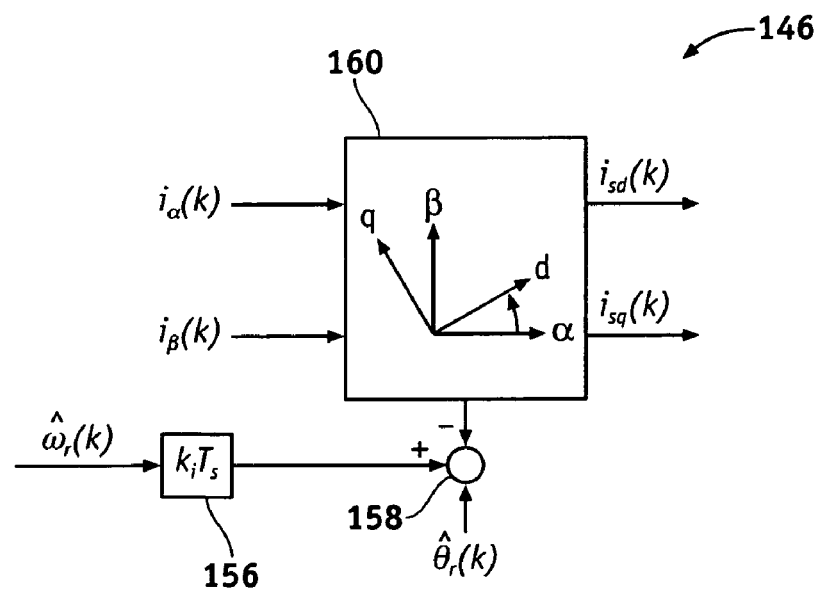

FIGS. 10 and 11 illustrate a voltage transformation portion 144 and a current transformation portion 146, respectively, of the coordinate conversion block 70. The voltage transformation portion 144 shown in FIG. 10 includes delay blocks 148, a voltage compensation block 150, a summer 152, and a coordinate conversion block 154. As shown, the stationary voltages, $v_\alpha^*$ and $v_\beta^*$, are received, and delayed two-cycles (i.e., $z^{-2}$), by the delay blocks 148 to account for the two-cycle lag between commanded voltages and the observance of the associated flux and then sent to the coordinate conversion block 154. The voltage compensation block 150 compensates for the delay of the voltage angle and is proportional to the operating speed. Summer 152 subtracts the estimated position from the output of the voltage compensation block 150 and sends its output to the coordinate conversion block 154. The coordinate conversion block 154 changes the stationary voltages, $v_\alpha^*$ and $v_\beta^*$, into the synchronous voltages, $v_{sd}$ and $v_{sq}$.

The current transformation portion 146 shown in FIG. 11 includes a current compensation block 156, a summer 158, and a conversion block 160. The current compensation block 156, in one embodiment, is used to compensate for a delay caused from use an analog filter.

Figure 12:
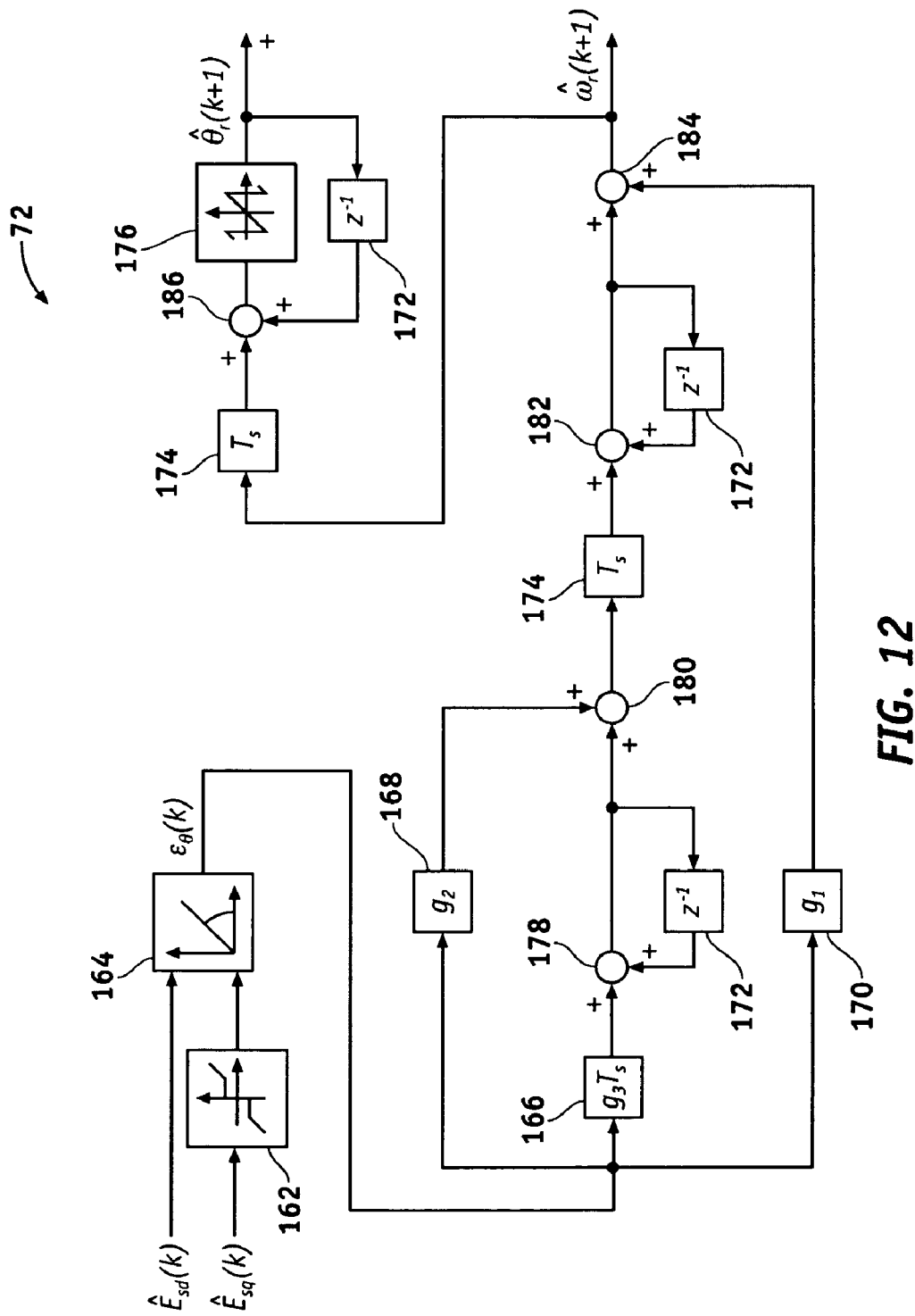
FIG. 12 is a schematic block diagram of a speed and position observer within the system of FIG. 4.

FIG. 12 illustrates the speed and position observer block 72 in greater detail. The speed and position observer 72 includes a BEMF limiter block 162, a position error block 164, gain blocks 166, 168, and 170, delay blocks 172, sampling time blocks 174, a position limiter block 176, and summers 178-186. The gain blocks 166-170 ($g_1$~$g_3$) determine the dynamic behavior of the speed and position observer 72. If there is $\Delta\theta$ of position error, then the estimated BEMF are approximated as $$\hat{E}_{sd}=\omega_r\Psi_f\sin\Delta\theta \qquad (1)$$

$$\hat{E}_{sq}=\omega_r\Psi_f\cos\Delta\theta \qquad (2)$$

At low speeds, $\hat{E}_{sq}$ may be too low to be used and thus may be limited by the BEMF limiter block 162 below a certain speed depending on the magnetic flux of the motor 40. The position error block 164 extracts the position error in Equations 1 and 2 utilizing, in one embodiment, a two-dimensional arc-tangent function. The resultant position error ($\epsilon_\theta(k)$) is used to generate the estimation of electrical motor speed for the next cycle ($\hat{\omega}_r(k+1)$) as shown in FIG. 12. The position limiter block 176 limits the integrated value of the estimation of the position for the next cycle ($\hat{\theta}_r(k+1)$) within ±180° of the electrical angle. The estimated position and speed are to be used for the next sampling period to meet the timing sequence. The estimated motor speed $\hat{\omega}_r$ is used in place of $\omega_r$ in FIGS. 1-11. It is also used to calculate gains $l_{11}$~$l_{42}$ in FIG. 7 and FIG. 8.

Except at low speeds where the absolute value of $\hat{E}_{sq}$ is limited by the BEMF limiter block 162, the position error block 164 provides a robust signal to track the position and speed of the motor irrespective of the magnitude of the permanent magnet, which is affected by the operating temperature, and the operating speed. Thus, it is possible to estimate the position and speed of the motor 40 regardless of the operating conditions of the motor 40.

Figure 13:
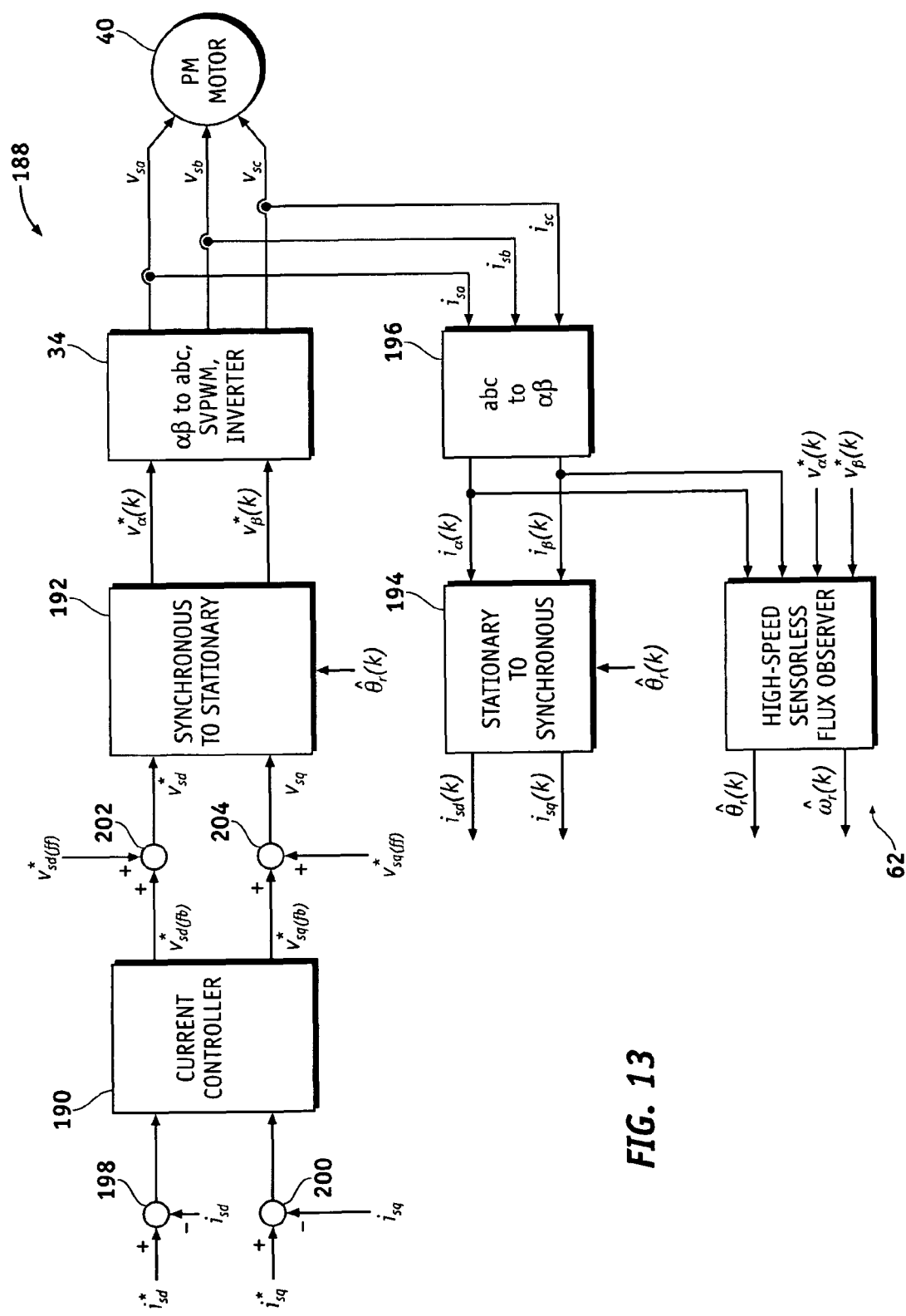
FIG. 13 is a schematic block diagram of a sensorless electric motor drive system, including the system shown in FIG. 4, according to one embodiment of the present invention.

FIG. 13 illustrates a sensorless electric motor drive system 188 according to one embodiment of the present invention. The motor drive system includes a current controller 190, rotational transformation blocks 192 and 194, a phase conversion block 196, the power inverter 34 (including a two-to-three phase conversion block and a PWM generation block), the motor 40, the position and speed estimator 62, and summers 198-204.

A torque command is sent from a high level controller, such as a torque controller or vehicle controller. The torque command is transformed into current commands, $i_{sd}^*$ and $i_{sq}^*$, which are DC quantities.

Phase conversion block 196 transforms three-phase currents sampled from the motor 40 into two-phase currents. The rotational transformation block 194 provides the rotational transformation (e.g., stationary to synchronous frames) with respect to the rotor position obtained from the proposed invention in order to change the two-phase AC currents, $i_\alpha(k)$ and $i_\beta(k)$, into two-phase DC currents, $i_{sd}$ and $i_{sq}$, which are used as current feedback at summers 198 and 200.

The difference between the current command and the current feedback drives the current controller 190 to generate the voltage commands, $V_{sd}^*$ and $v_{sq}^*$, which are also DC quantities. At summers 202 and 204, feedforward terms (or decoupling voltages) $v_{sd(f)}^*$ and $v_{sq(f)}^*$ are used to decouple the voltage induced by the flux inside the motor at the output of the current controller 190. The feedforward terms are calculated from the flux table, $\Psi_d$ and $\Psi_q$, as $$v_{sd(f)}^*=-\omega_r\Psi_q(i_{sd},i_{sq}) \qquad (3)$$

$$v_{sq(f)}^*=\omega_r\Psi_d(i_{sd},i_{sq}) \qquad (4)$$

Although the commanded currents may be used in Equations 3 and 4, the decoupling voltages calculated using the commanded currents may result in oscillatory current control response at high speed operation.

As mentioned earlier, three-phase AC voltage is usually used to drive the motor, so an inverse-rotational transform (e.g., synchronous to stationary frames) from $v_{sd}{}^*$ and $v_{sq}{}^*$ to $v_\alpha{}^*$ and $v_\beta{}^*$ with respect to the rotor position is performed by rotational transformation block 192. These two-phase AC voltage commands, $v_\alpha{}^*$ and $v_\beta{}^*$, are then transformed into three-phase AC quantities by the inverter 34.

As described above, the position and speed estimator 62 uses the outputs of rotational transformation block 192 and the phase conversion block 196 to estimate the flux and the BEMF.

Figure 14:
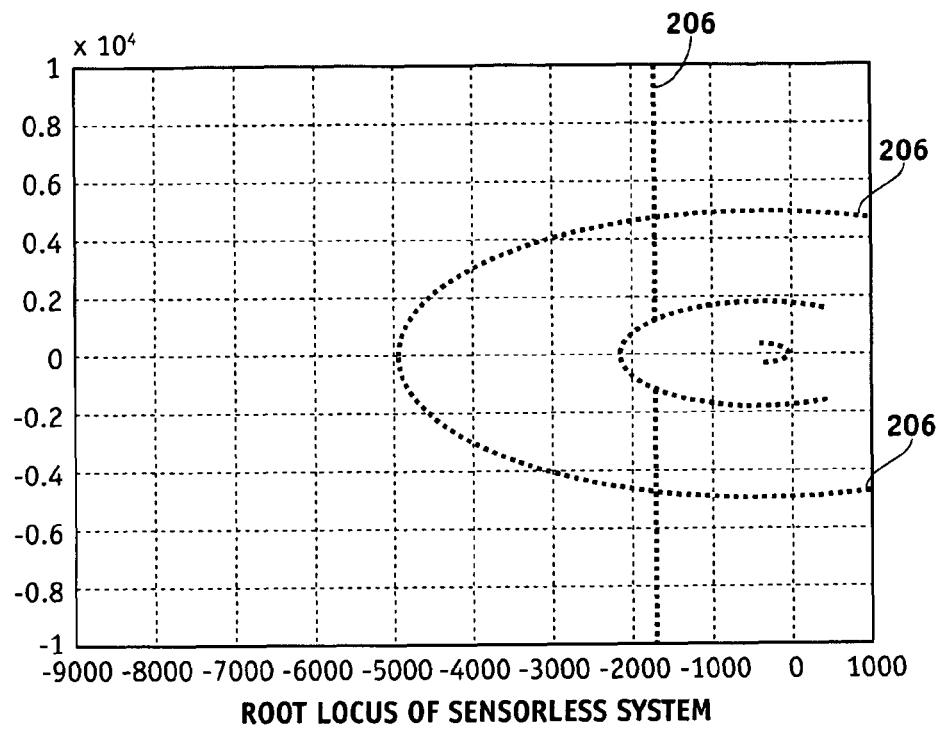
FIG. 14 is a graphical illustration of the root locus of a prior art sensorless electric motor control system.

FIG. 14 graphically illustrates the root locus of a prior art sensorless motor control system as the motor speed changes. As shown, some of the poles 206 lie to the right of the imaginary axis (vertical axis), which results in system instability as the motor speed increases. In prior art systems, it is sometimes necessary to place the poles of the flux observer and the current controller to be moved toward the left side in order to avoid such unstable poles as the motor speed increases.

Figure 15:
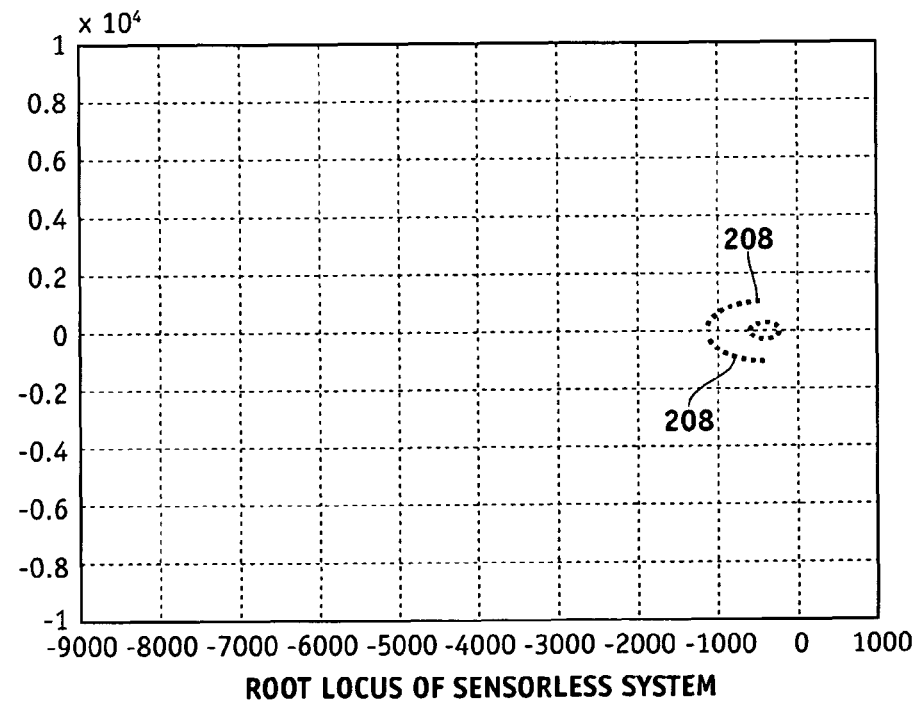
FIG. 15 is a graphical illustration of the root locus of a sensorless electric motor control system according to an embodiment of the present invention.

FIG. 15 graphically illustrates the root locus of a sensorless motor control system according to an embodiment of the present invention at the same operating speed as that of FIG. 14. The poles 208 move according to the operating speed (shown between 10,000 and 120,000 r/min) but do not cross the imaginary axis even at 120,000 r/min. Therefore, the stability of the system is improved. Additionally, the locations of the poles is nearly unaffected by the operating speed. Thus, it is possible to increase the bandwidth over the wide range of the operating speed without losing the stability, which further improves performance of the sensorless control system.

Other embodiments may utilize the method and system described above in implementations other than automobiles, such as watercraft and aircraft. The electric motor and the power inverter may have different numbers of phases, such as two or four. Other forms of power sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method comprising:
providing a signal comprising at least first and second cycles to an electric motor, wherein the first cycle occurs before the second cycle;
measuring a current flowing through the electric motor during the second cycle;
calculating, at a processor, a first flux value for the electric motor associated with the first cycle of the signal; and
calculating, at the processor, a second flux value based on the first flux value for the electric motor associated with the second cycle of the signal and the measured current flowing through the electric motor during the second cycle, wherein the first and second flux values each comprise a flux linkage, a back electromotive force (BEMF) generated by the electric motor, or a combination of the flux linkage and the BEMF.

2. The method of claim 1, wherein the signal comprises a third cycle.

3. The method of claim 2, further comprising measuring a current flowing through the electric motor during the third cycle and wherein the calculating of the second flux value is further based on the measured current flowing through the motor during the third cycle.

4. The method of claim 3, wherein the third cycle occurs before the first cycle.

5. The method of claim 4, wherein the calculating of the first flux value comprises measuring a current flowing through the electric motor during the first cycle.

6. The method of claim 5, wherein the calculating of the second flux value comprises determining a voltage associated with the measured current flowing through the electric motor during the third cycle.

7. The method of claim 6, wherein the first cycle of the signal occurs before the second cycle of the signal and the third cycle of the signal occurs before the first cycle of the signal.

8. An automotive drive system comprising:
an electric motor;
a direct current (DC) power supply coupled to the electric motor;
a power inverter coupled to the electric motor and the DC power supply to receive DC power from the DC power supply and provide alternating current (AC) power to the electric motor; and
a processor in operable communication with the electric motor, the DC power supply, and the power inverter, the processor being configured to:
provide a signal comprising at least first and second cycles to the electric motor, wherein the first cycle occurs before the second cycle;
measure a current flowing through the electric motor during the second cycle;
calculate a first flux value for the electric motor associated with the first cycle of the signal; and
calculate a second flux value for the electric motor associated with the second cycle of the signal based on the first flux value and the measured current flowing through the electric motor during the second cycle, wherein the first and second flux values each comprise a flux linkage, a back electromotive force (BEMF) generated by the motor, or a combination of the flux linkage and the BEMF.

9. The automotive drive system of claim 8, wherein the signal comprises a third cycle and the processor is further configured to measure a current flowing through the electric motor during the third cycle and wherein the calculating of the second flux value is further based on the measured current flowing through the electric motor during the third cycle.

10. The automotive drive system of claim 9, wherein the signal is a pulse width modulation (PWM) signal and wherein the third cycle of the PWM signal occurs before the first cycle of the PWM signal.

11. The method of claim 1, wherein the electric machine comprises a multi-phase electric machine.

12. The automotive drive system of claim 8, wherein the electric machine comprises a multi-phase electric machine.

13. A method performed at a processor, the method comprising:
  generating estimated stator winding flux values based on calculated flux increments;
  generating measured stator winding flux values based on motor currents;
  subtracting the estimated stator winding flux values from the measured stator winding flux values to generate flux errors;
  generating estimated back electromotive force (EMF) values based on the flux errors, wherein the calculated flux increments are generated based on the motor currents, motor voltages, the estimated back EMF values and the estimated stator winding flux values;
  generating an estimated rotor flux angular position error based on the estimated back EMF values; and
  generating, based on the estimated rotor flux angular position error, an estimated rotor flux angular position, and an estimated rotor frequency.

* * * * *